US011494394B2

(12) United States Patent
Bui et al.

(10) Patent No.: US 11,494,394 B2
(45) Date of Patent: Nov. 8, 2022

(54) DATA VERSIONING IN A MULTI-DATACENTER TOPOLOGY

(71) Applicant: PayPal, Inc., San Jose, CA (US)

(72) Inventors: Kim Dung Bui, Singapore (SG); Chun Kiat Ho, Singapore (SG); Lin Song, Singapore (SG); Kai Xie, Singapore (SG)

(73) Assignee: PayPal, Inc., San Jose, CA (US)

( * ) Notice: Subject to any disclaimer, the term of this patent is extended or adjusted under 35 U.S.C. 154(b) by 246 days.

(21) Appl. No.: 16/730,574

(22) Filed: Dec. 30, 2019

(65) Prior Publication Data

US 2021/0200760 A1 Jul. 1, 2021

(51) Int. Cl.
G06F 16/2458 (2019.01)
G06F 16/21 (2019.01)
G06F 16/248 (2019.01)

(52) U.S. Cl.
CPC ........ G06F 16/2474 (2019.01); G06F 16/219 (2019.01); G06F 16/248 (2019.01)

(58) Field of Classification Search
CPC ... G06F 16/2474; G06F 16/219; G06F 16/248
USPC ........................................................ 707/695
See application file for complete search history.

(56) References Cited

U.S. PATENT DOCUMENTS 6,964,044 B1 * 11/2005 Hudson ..................... G06F 8/71
709/203
9,886,490 B1 * 2/2018 Kapoor ................. G06F 16/211
2007/0282915 A1 * 12/2007 Vosshall ............. G06F 16/2365
2009/0293043 A1 * 11/2009 Begel ........................ G06F 8/71
717/122
2010/0076930 A1 * 3/2010 Vosshall .................. G06F 3/065
707/638

(Continued)

OTHER PUBLICATIONS

Fusion Middleware Administrator's Guide for Oracle Access Management; 17.3 Active-Active Multi-Data Center Topology Deployment, Oracle; https://docs.oracle.com/cd/E52734_01/oam/AIAAG/index.html, 3 pages. [Retrieved Oct. 22, 2019].

(Continued)

*Primary Examiner* — Joshua Bullock
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to data versioning in a multi-datacenter topology. In various embodiments, a computer system at a first datacenter may execute a query at a first point in time against a particular dataset that is maintained at the first datacenter. The particular dataset includes a first data record with a corresponding version number, where the version number is associated with a value of the first data record at the first point in time. In response to the first query, the computer system may receive a first results dataset that includes the first data record with its corresponding version number. The computer system may then store information indicative of the results dataset that is usable to retrieve, at a subsequent time from a historical version of the particular dataset at a second datacenter, the first data record with the same value as at the first point in time.

20 Claims, 8 Drawing Sheets

(56) References Cited

U.S. PATENT DOCUMENTS

| | | | |
|---|---|---|---|
| 2010/0083230 A1* | 4/2010 | Ramakrishnan | G06F 8/71 717/121 |
| 2013/0138668 A1* | 5/2013 | Sharma | G06Q 10/10 707/756 |
| 2013/0232165 A1* | 9/2013 | Sharma | G06F 16/2358 707/769 |
| 2017/0351585 A1* | 12/2017 | Bourbonnais | G06F 16/27 |

OTHER PUBLICATIONS

How to view historical versions of datasets?; https://help.knoema.com/hc/en-us/articles/360023380772-How-to-view-h, 2 pages. [Retrieved Oct. 25, 2019].

* cited by examiner

_400_

Execute, at a first point in time, a first query against a particular dataset at a first production datacenter, where the particular dataset includes a plurality of data records that are each associated with a corresponding version number
_402_

Receive, in response to executing the first query, a first results dataset that includes a first data record with a first version number that is associated with a value of the first data record at the first point in time
_404_

Store information indicative of the first results dataset in a data store, where the information includes the first version number associated with the first data record and is usable to retrieve, from a historical version of the particular dataset at a subsequent point in time, the first data record with the same value as at the first point in time
_406_

_FIG. 4_

500

Retrieve, by a first computer system at a simulation datacenter, information indicative of a first results dataset, where the information includes:

- A first version number associated with a first data record from the first results dataset, where the first results dataset was retrieved from a particular dataset at a first point in time, and where the first version number is associated with a value of the first data record at the first point in time
502

Maintain, at the simulation datacenter, a historical version of the particular dataset, where the historical version of the particular dataset includes one or more historical values for the first data record at different points in time
504

Based on the first version number, retrieve, by the first computer system at a subsequent point in time, the first data record from the historical version of the particular dataset, where the first data record retrieved at the subsequent point in time has the same value as at the first point in time
506

FIG. 5

DATA VERSIONING IN A MULTI-DATACENTER TOPOLOGY

BACKGROUND

Technical Field

This disclosure relates generally to multi-datacenter systems and, more particularly, to data versioning in a multi-datacenter topology.

Description of the Related Art

In a multi-datacenter topology, some datasets are replicated and stored at multiple datacenters. As a dataset is updated, it takes a certain amount of time for the changes to be reflected in the copy of the dataset stored at each of the datacenters. For example, in some instances, it can take hours or days for a given data record in a dataset to become consistent across all datacenters. These datasets may be considered "eventually consistent" because, while the copies of the datasets in the different datacenters will eventually be consistent with one another (e.g., after the changes have propagated to each of the datacenters) a given data record stored at a first datacenter may not be consistent with the same data record stored at a second datacenter at a given point in time. This lack of point-in-time consistency of data between datacenters may present various technical problems. For instance, the lack of consistency of a particular dataset across different datacenters may degrade the quality and performance of various data analytics operations performed using the particular dataset.

BRIEF DESCRIPTION OF THE DRAWINGS

FIG. 4 is a flow diagram illustrating an example method for utilizing data versioning in a multi-datacenter topology, according to some embodiments.

FIG. 5 is a flow diagram illustrating an example method for utilizing data versioning in a multi-datacenter topology, according to some embodiments.

DETAILED DESCRIPTION

Figure 1:
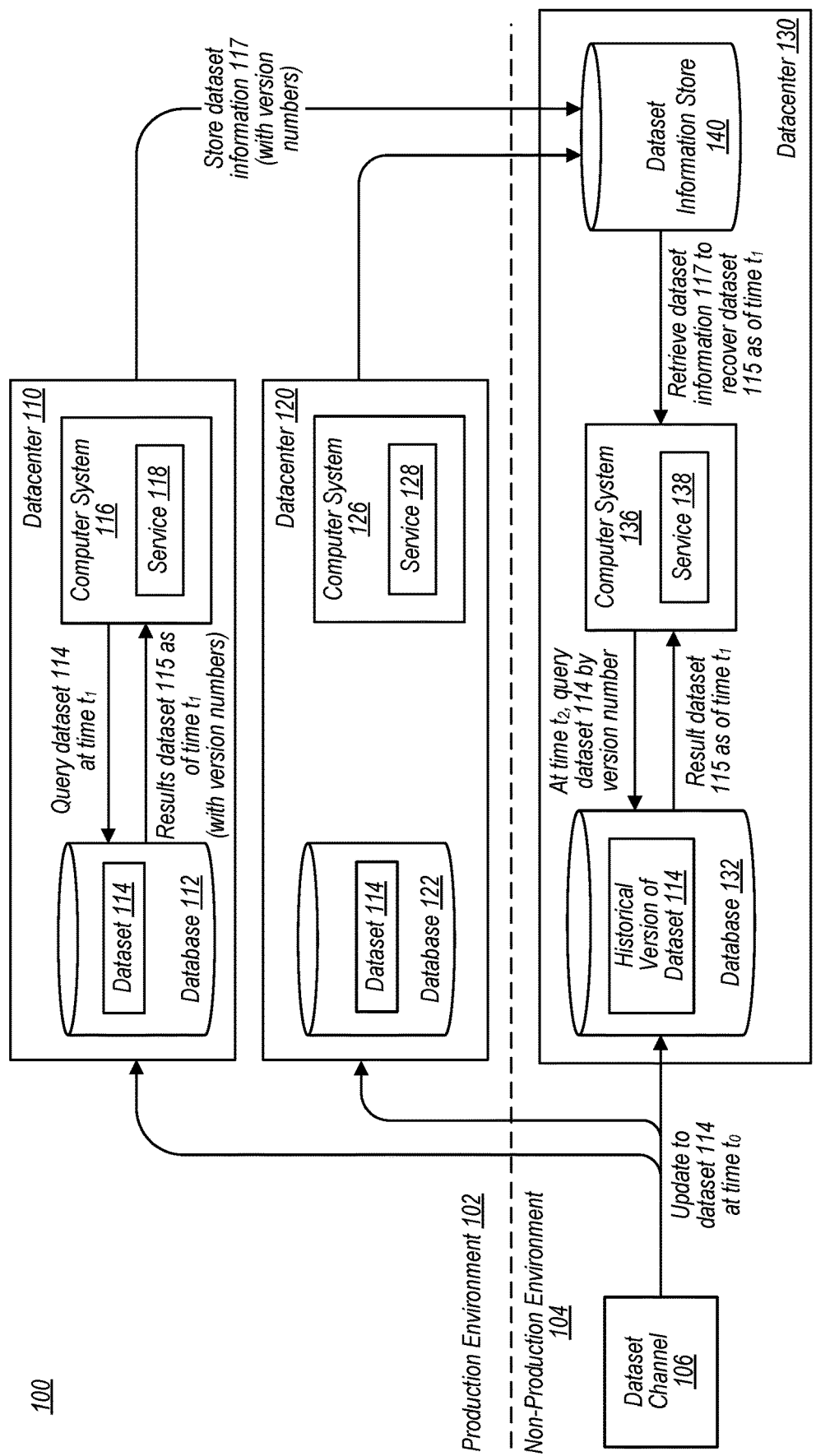
FIG. 1 is a block diagram illustrating an example multi-datacenter system, according to some embodiments.

Many web-related services utilize a multi-datacenter topology in which identical (or substantially overlapping) copies of datasets are replicated at multiple datacenters, potentially in different geographical locations. In such a multi-datacenter topology, multiple datacenters may be active at the same time and different datacenters may be used to service requests from different groups of users (based, for example, on a geographical location of the requesting user).

As noted above, such a multi-datacenter topology may present various technical challenges. For instance, as the data in a dataset is updated (e.g., a new record is inserted or an existing record is updated) it takes a certain amount of time for these changes to be reflected in the copy of the dataset stored in each of the datacenters. In some instances, for example, it can take hours or days for a given data record in a dataset to become consistent across all datacenters. These datasets may be considered "eventually consistent" because, while the copies of the datasets in the different datacenters will eventually be consistent with one another (e.g., after the changes have propagated to each of the datacenters) a given data record stored at a first datacenter may not be consistent with (that is, it may have a different value than) the same data record stored at a second datacenter at a given point in time.

In various embodiments, this lack of point-in-time consistency of data between datacenters may present significant technical problems. As one non-limiting example, within a particular multi-datacenter topology, there may be both a production environment, which includes one or more datacenters primarily used to host software applications and serve online traffic from end users, and a non-production environment, which includes one or more datacenters used primarily to perform testing, simulations, or other analytical operations. (Note, however, that datacenters in a production environment may also be used to perform operations other than servicing online traffic, such as performing analytical operations, and that datacenters in a non-production environment may be used to perform operations other than testing and simulations. The terms "production environment" and "non-production environment," are simply used herein to denote a significant or common function performed by datacenters within their respective environments.) In some instances, it is desirable to perform analytical operations both in the production environment and, at a subsequent time, to perform the same or similar analytical operations in the non-production environment. As a non-limiting example, machine learning operations may be performed at a first datacenter that is in the production environment, using a particular dataset maintained at the first datacenter to perform a simulation (e.g., to test a risk-detection scenario). In such an example, the machine learning model is trained based on the particular dataset as it existed at a first point in time.

In many instances, it may be desirable to perform analytical operations at a subsequent time using the particular dataset as it existed at the first time. For example, a data science team may wish to re-run tests or simulations using the same data as it existed when the tests or simulations were originally run, e.g., to test hypotheticals, perform debugging operations, investigate incidents, etc. In some cases, a datacenter (such as a non-production datacenter) may maintain a historical version of the particular dataset that includes historical values for the data records in the dataset. That is, this historical version of the particular dataset may include multiple values for each data record (or a significant number of the data records in the dataset), indicating the value of the data records at different points in time over a particular retention time period (e.g., six months, 12 months, 18 months, etc.). In various embodiments, this historical version of the particular dataset may provide access to all current and historical versions (up to the retention period) of the data records within the particular dataset. Continuing with the present example, data scientists may wish to generate new or updated machine learning models using the particular dataset as it existed at the first point in time. In various instances, however, the "eventually consistent" nature of the particular dataset may present a significant technical problem that degrades the effectiveness of analytical operations performed using this historical data. For example, as explained in more detail below, differences in the data used to perform the analytical operations at the first time and the second time may negatively affect the quality and accuracy of the analytical operations, negatively impacting the performance of the system as a whole.

In various embodiments, the disclosed systems and methods may solve these and other technical problems by performing data versioning for datasets that are stored across multiple datacenters in a multi-datacenter deployment topology. For example, in some embodiments, the disclosed techniques include generating version numbers for data records in a dataset as those data records (or the entire dataset) are updated. These version numbers enable the system to uniquely identify a given data record as it existed at a given point in time. As the dataset is replicated across different datacenters, the data records carry their corresponding version numbers with them. When analytical operations are then performed on the dataset at a particular datacenter at a first time, the version numbers associated with the data records used in the operations may be stored such that subsequent analytical operations may be performed (e.g., at a simulation datacenter) on the same dataset as it existed at the first time. For example, as the particular dataset is queried at the first time, information indicative of the results dataset, including version numbers of the data records in the results dataset, may be stored. At a subsequent point in time, a computer system at a simulation datacenter may retrieve that information indicative of the results dataset, including the version numbers of the data records included therein, and use these version numbers to retrieve the same results dataset, from a historical version of the particular dataset, as it existed at the earlier time. In various embodiments, the disclosed techniques enable analytical operations (e.g., simulations, training machine learning models, etc.) based on a dataset as it existed at a selected point in time in a manner that makes use of efficient data storage and provides fast retrieval of historical data. This, in turn, improves performance of the analytical operations performed within the multi-datacenter system and the operation of the multi-datacenter system as a whole.

Referring now to FIG. 1, a block diagram illustrating a multi-datacenter system 100 is shown, according to some embodiments. In FIG. 1, multi-datacenter system 100 includes both a production environment 102 and a non-production environment 104. In the depicted embodiment, production environment 102 includes datacenters 110 and 120. In various embodiments, these datacenters may be remotely located relative to each other and used to provide one or more web services to various user devices (not shown in FIG. 1, for clarity). Further, in the depicted embodiment, non-production environment 104 includes datacenter 130. Note that, although only three datacenters are depicted in multi-datacenter system 100 of FIG. 1, this embodiment is provided merely as an example. In other embodiments, system 100 may include any suitable number of datacenters in production environment 102 or non-production environment 104.

In various embodiments, datacenter 130 may be a "simulation datacenter" used, at least in part, to perform testing, simulations, machine learning operations, or any of various other analytical operations. In various embodiments, a simulation datacenter 130 may enable activities that greatly improve the effectiveness of various analytical operations. For example, in various embodiments, simulation datacenter 130 may enable an application (e.g., a risk detection service) to "replay" historical traffic to retrieve a historical version of data as it existed in the production environment 102 (e.g., at a production datacenter 110 or 120, for example) at a particular point in time. This capability may be particularly useful for simulating hypothetical scenarios or reproducing past events. Further, in some embodiments, simulation datacenter 130 may be used to train and test machine learning models (or perform other analytical operations) using historical data from the historical version of one or more datasets. As a non-limiting example, simulation datacenter 130 may be used to simulate the same machine learning model multiple times to test for consistency. Additionally, in some embodiments, simulation datacenter 130 may be used to "back-fill" analytical features by computing those features using historical data (e.g., from historical versions of one or more datasets) and then selecting the best subset of the features for use in machine learning models. This capability of simulation datacenter 130 may be particularly useful for situations in which a new feature of interest is discovered, but for which there is not enough current data to adequately train a machine learning model. By utilizing backfilling, the simulation datacenter 130 may greatly reduce the time-to-market for machine learning models. Note that, in various embodiments, datacenter 130 may also be remotely geographically located relative to other datacenters within the multi-datacenter system 100.

In various embodiments, identical (or substantially overlapping) copies of one or more datasets may be replicated at each of datacenters 110, 120, and 130. For example, in the depicted embodiment, dataset 114 may be stored at each of datacenters 110, 120, and 130. Dataset 114 may be any of various types of datasets. As a non-limiting example, in embodiments in which system 100 provides an online payment service to remote users, dataset 114 may include information corresponding to user activity and attempted transactions. In such embodiments, dataset 114 may be used, for example, to perform risk-detection operations to detect and assess potentially fraudulent operations attempted via the system 100. Accordingly, there may be high demands placed on the ability to accurately reproduce data from dataset 114 at a selected point in time to facilitate such risk-detection operations. As changes are made to dataset 114, these changes may be published to the copies of dataset 114 stored at each of the datacenters. For example, as shown in FIG. 1, dataset channel 106 may push updates to dataset 114 that occur at a time $t_0$ to each of the local copies of dataset 114 at the different datacenters. Note that, in some embodiments, the source of the updates to a dataset 114 may be a non-production datacenter (such as datacenter 130) or a production datacenter (such as datacenters 110 or 120). After receiving these updates, the copy of dataset 114 stored each of the datacenters 110-130 may be updated accordingly. As noted above, however, it may (and often does) take a different amount of time for these changes to be populated to the copy of dataset 114 stored at each of the different datacenters. While the copies of dataset 114 stored at the different datacenters will eventually become consistent, individual records within the dataset 114 may differ between datacenters at a given point in time. As an example, when dataset channel 106 publishes an update to a first data record included in dataset 114, this change may be reflected in the copy of dataset 114 stored at datacenter 130 relatively quickly (e.g., within minutes or hours after the event time) because the non-production environment 104 may utilize higher throughput batch processing. This same change, however, may take longer (e.g., hours or days) to arrive at datacenters 110 or 120 because the production environment 102 may impose throttled throughput on the channel to save bandwidth for online services, according to some embodiments. In prior systems, this lack of consistency at a given point in time may cause significant technical problems, for example, when performing analytical operations using dataset 114.

For example, in some embodiments, analytical operations may be performed at a production datacenter, such as datacenter 110, at a first time $t_1$ using data from dataset 114 as it exists at this first time. As noted above, in many instances it may be desirable to perform additional analytical operations (e.g., at a non-production datacenter, such as simulation datacenter 130) at a subsequent time $t_2$ using data from dataset 114 as it existed at the earlier time $t_1$. Continuing with the example above, it may be desirable to generate a new machine learning model based on dataset 114 as it existed at time $t_1$, for example using different machine learning algorithms or a different feature set. The "eventually consistent" nature of dataset 114 may present various technical problems, however. For example, since the copy of dataset 114 stored at datacenter 110 and the copy of dataset 114 stored at the simulation datacenter 130 are "eventually consistent," it is possible (and, in some cases, likely) that values for some of the data records in the dataset 114 will be different at these different datacenters at the first time $t_1$. When the data from the historical version of dataset 114 is retrieved at the subsequent time $t_2$, then, it is possible that some of the values for the data records will be different from their value at datacenter 110 at time $t_1$. Using these different versions of the dataset 114 may negatively affect the quality and accuracy of the analytical operations performed at the subsequent time $t_2$. As a non-limiting example, machine learning models trained or features built using the divergent data may result in machine learning models that are less effective at performing certain critical tasks, such as risk-detection. Further, in some embodiments, simulations performed using such data may not reproduce accurate outcomes for regressions, incident investigation, or debugging operations.

One potential approach of addressing the problems caused by the eventually consistent nature of datasets stored across multiple datacenters is to maintain historical versions of the datasets at each of the datacenters at which a dataset is stored. For example, using such approach, each datacenter in a multi-datacenter topology (including both production and non-production datacenters) may store a historical version of a dataset with multiple values for each data record in the dataset, indicating the value of the data records at multiple points in time over a particular retention time period. This approach also presents various technical shortcomings, however. For example, a dataset (such as dataset 114) may be quite large (e.g., multiple terabytes or petabytes in size), making it expensive, impractical, and inefficient for a historical version of the dataset to be maintained at multiple datacenters.

In various embodiments, however, the disclosed techniques utilize data versioning to solve these or other technical problems by generating version numbers for datasets that are stored across multiple datacenters in a multi-datacenter deployment topology. For example, as explained in more detail below with reference to FIG. 2, when an update to dataset 114 is made, an indexer module (described in more detail below) may generate a version number for each of the data records in dataset 114 that are being updated. These version numbers may be stored along with the data records as they are replicated at the various datacenters within the multi-datacenter system 100. For example, when a data record in dataset 114 is updated, it will be stored with the same version number in each of datacenters 110, 120, and 130, according to various embodiments.

In various embodiments, these version numbers may be used to uniquely identify the value of a given data record in a historical version of dataset 114 at a given point in time. For example, in FIG. 1, datacenter 110 includes computer system 116 on which service 118 is hosted. Service 118 may, as one non-limiting example, perform various analytical operations using dataset 114 stored in database 112 at the datacenter 110. To perform these operations, service 118 may utilize a query engine module (described in more detail below with reference to FIG. 2) to execute a query against dataset 114 at a first time $t_1$ to retrieve a results dataset 115. According to various disclosed embodiments, the data records included in the results dataset will include corresponding version numbers that are associated with the values of those data records at the first time $t_1$. Using this results dataset 115, service 118 may perform any of various operations (e.g., training a machine learning model or any other analytical operation). As described in more detail below with reference to FIG. 2, information corresponding to the results dataset 115, including version numbers associated with the data records in the results dataset 115, may be stored in dataset information store 140. For example, in some embodiments, this dataset information 117 may specify the name of dataset 114 and may include the key values and version numbers for the data records included in the results dataset 115. Additionally, in some embodiments, information corresponding to the query performed at time $t_1$ against the dataset 114 to retrieve the results dataset 115 may also be stored in dataset information store 140. (Note that, although shown as part of datacenter 130, in various embodiments dataset information store 140 may be maintained at a separate location that is accessible to both datacenter 110 and datacenter 130 via one or more communication networks.) In various embodiments, this dataset information may be referred to as "historical traffic data" or a "driver set" and may be usable, at a subsequent time $t_2$, to retrieve the results dataset 115 as it existed at time $t_1$ from the historical version of dataset 114 maintained at simulation datacenter 130. For example, assume that at a subsequent time $t_2$, a user wishes to perform additional analytical operations using the version of results dataset 115 as it existed at time $t_1$. In such an example, the dataset information 117 indicative of results dataset 115 may be retrieved from dataset information store 140. Using this dataset information 117, the same results dataset 115, as it existed at time $t_1$, may be retrieved from historical version of dataset 114 maintained at datacenter 130. The user (using, for example, service 138) may then perform the operations (e.g. analytical operations discussed above) on this results dataset 115, as desired.

In prior systems, service 138 at the simulation datacenter 130 may be required to retrieve this results dataset 115 based on timing information associated with the time $t_1$ at which the results dataset 115 was initially retrieved by service 118. For example, service 138 may attempt to retrieve the results dataset based on key values for the data records and the time $t_1$ at which the query was originally executed. Due to a lack of point in time consistency of dataset 114, however, such an approach may cause some or all of the values of the data records in the results dataset 115 to be different when retrieved from the historical version of dataset 114 stored in database 132.

In various embodiments, however, the disclosed systems and methods provide various technical improvements to the functioning of multi-datacenter system 100. For example, the disclosed techniques enable the results dataset 115, as it existed at the earlier time $t_1$, to be retrieved from the historical version of dataset 114 maintained at the simulation datacenter 130 at a subsequent time $t_2$. Further, in various embodiments, the disclosed techniques are "datacenter agnostic," in that simulation datacenter 130 may be used to enable simulations for models and services based on traffic from any of the datacenters in the production environment 102. Additionally, in various embodiments, the disclosed techniques utilize data storage more efficiently that prior systems. For example, in various embodiments, only one copy of the historical version of dataset 114 is stored within the system 100, rather than being required to replicate the historical version of dataset 114 at each datacenter. Also, in some embodiments, the disclosed systems and methods may enable faster retrieval of historical data from a historical version of dataset 114 by retrieving such information based on version number, rather than by a requested point in time. For example, version numbers, in various embodiments, may be used to uniquely identify a data record from the historical version of dataset 114 as that data record existed at a selected point in time, whereas, using prior techniques, the data record may be retrieved from the historical version of dataset 114 by scanning the data record to find the value with a timestamp that is less than the selected historical point in time. Thus, in various embodiments, the disclosed systems and methods address technical problems in the context of multi-datacenter systems and improve the functioning of such systems as a whole.

Figure 2:
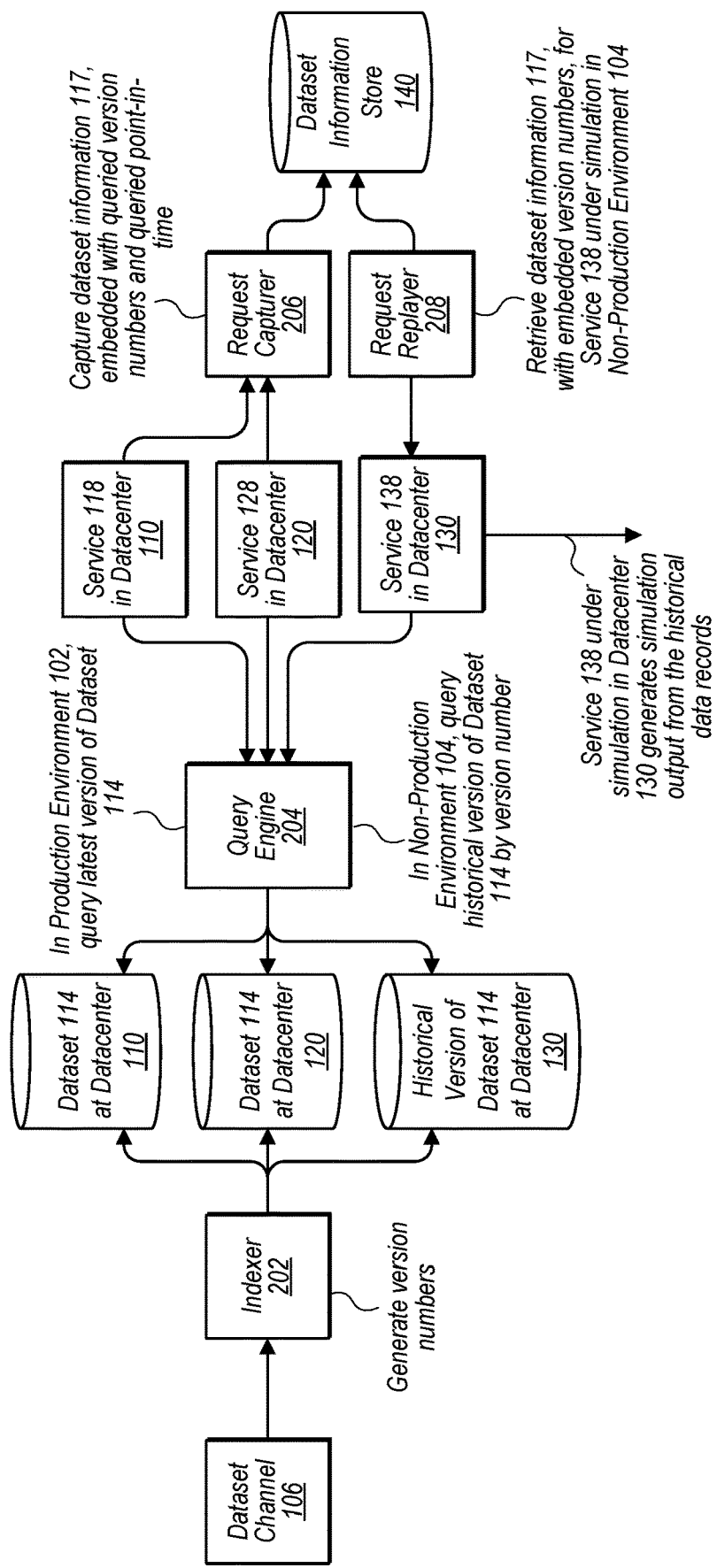
FIG. 2 is a block diagram illustrating an example multi-datacenter system, according to some embodiments.

Turning now to FIG. 2, a block diagram illustrating an example multi-datacenter system 200 is depicted, according to some embodiments. In FIG. 2, system 200 includes indexer 202, query engine 204, request capturer 206, and request replayer 208. Note that, in some embodiments, each of the indexer 202, query engine 204, request capturer 206, and request replayer 208 may be implemented as standalone services within the system 200. For example, in some embodiments, some or all of the above-referenced modules may be implemented as microservices executed by various computer systems at one or more datacenters within the multi-datacenter system 200. (Note that, in some embodiments, the term "computer system" may refer to a single machine executing at a datacenter. In other embodiments, the term "computer system" may refer to multiple machines executing at a datacenter for the benefit of a single entity.) In other embodiments, however, one or more of indexer 202, query engine 204, request capturer 206, and request replayer 208 may be implemented at one or more of the datacenters in system 200. For example, in some embodiments, an instance of indexer 202 and query engine 204 may be executed at each of datacenters 110, 120, and 130 while an instance of request capturer 206 may be executed at one or more of the production datacenters 110 and 120 and an instance of request replayer 208 may be executed at the simulation datacenter 130. Additionally, note that in some embodiments, indexer 202 may be integrated into dataset channel 106.

In FIG. 2, system 200 includes dataset channel 106, which is operable to publish updates to dataset 114 to the various datacenters in multi-datacenter system 200. In some embodiments, dataset channel 106 is a service that aggregates data from one or more data sources (e.g., from a data lake, from one or more of the production or non-production datacenters (e.g., datacenters 110-130, etc.) and generates and updates one or more datasets, such as dataset 114. In various embodiments, dataset channel 106 is operable to write updates to dataset 114 through indexer 202, which, in turn, is operable to generate version numbers for the updated data records in dataset 114. In some embodiments, indexer 202 may generate a version number for each individual data record within dataset 114 that is being updated. Such embodiments may be particularly useful for situations in which updates to dataset 114 are provided in a "streaming" manner, in which updates to the dataset 114 are published to the datacenters as these changes occur (e.g., in real-time or near real-time). In other embodiments, however, updates to dataset 114 may be provided in a "batch" manner in which updates to dataset 114 are published to the copies maintained at the different datacenters at a predetermined time interval (e.g., every day, once per hour, etc.). In such embodiments, indexer 202 may be operable to generate a version number for each batch such that each data record within dataset 114 that was updated in a given batch has the same version number. In various embodiments, the updated dataset 114, along with the generated version numbers, are then stored at the various datacenters 110-130 in multi-datacenter system 200.

Note that the manner in which the version numbers are stored may vary by datacenter. For example, in some embodiments, dataset 114 stored at the production datacenters (e.g., datacenter 110 and datacenter 120) may store version numbers in a separate column such that each data record may have a corresponding version number stored therewith (e.g., in addition to a key value for the data record, according to some embodiments). In various embodiments, this approach to storing the version numbers may allow query engine 204 to read the version numbers as it performs queries against the dataset 114. Note, however, that this embodiment is provided merely as one non-limiting example. In other embodiments, version numbers for the data records in dataset 114 may be stored using any of various suitable techniques. At the non-production datacenters, such as datacenter 130 of FIG. 1, the updates to dataset 114 may be persisted within the historical version of dataset 114 stored in database 132. As noted above, the historical version of dataset 114 may include multiple values for each data record, with the multiple values corresponding to the state of a given data record at different points in time. In various embodiments, the version numbers, generated by indexer 202, may be indexed within the historical version of dataset 114 maintained at simulation datacenter 130, allowing the data records in dataset 114 to be queried by version number.

Various operations may be performed on the dataset 114 stored at any of the production datacenters (e.g. datacenter 110 or 120). For example, in some embodiments, analytical operations may be performed using dataset 114. One non-limiting example of such analytical operations may be the training of machine learning models for use in fraud detection. For example, in the embodiment of FIG. 2, service 118 (hosted by one or more computer systems within datacenter 110) may be a risk model server used to train and run regression models generated based, in part, on data from dataset 114. When service 118 is called to perform a computational operation on dataset 114 (e.g., at a first time $t_1$), it may use query engine 204 to query the latest version of dataset 114 maintained that datacenter 110, according to some embodiments. Query engine 204 may then execute a query against the copy of dataset 114 maintained at datacenter 110 and return a results dataset 115 to the requesting service 118. For example, in some embodiments, query engine 204 may retrieve data records from dataset 114 based on key values associated with the data records in the results dataset 115. (Note that, although the results dataset 115 has been described herein as a subset of dataset 114, this embodiment is provided merely as an example. In some instances, query engine 204 may retrieve all (or a substantial portion of) dataset 114 as it exists at a time $t_1$ for use by service 118.) In various embodiments, the data records included in the results dataset 115 may include version numbers that correspond to the values of the respective records at the time $t_1$. Thus, in various embodiments, query engine 204 is operable to retrieve the current values for the data records in dataset 114, along with their corresponding version numbers, and return this results dataset 115 to the requesting service 118. Note that, in various embodiments, query engine 204 may execute the query against the dataset 114 based on any suitable combination of search criteria specified by the requesting service 118.

FIG. 2 further includes request capturer 206, which is operable to capture dataset information 117 (that is, the "driver set") associated with the results dataset 115 retrieved by query engine 204 at time $t_1$, according to various embodiments. For example, request capturer 206 may capture information such as an identifier associated with the dataset 114, version numbers associated with the dataset 114 or with the data records included in the results dataset 115, the point in time $t_1$ at which the results dataset 115 was retrieved, etc. In various embodiments, request capturer 206 is operable to identify this dataset information 117 and save it to a dataset information store 140 that is accessible to one or more non-production datacenters, such as datacenter 130. In some embodiments, dataset information store 140 may be a data lake implemented using any of various suitable storage technologies, such as Apache™ Hadoop, as one non-limiting example.

FIG. 2 further includes request replayer 208, which, in various embodiments, is operable to retrieve dataset information 117 from dataset information store 140. For example, in some embodiments, services hosted at a non-production datacenter (e.g. such as simulation datacenter 130) may be used to perform operations (e.g. analytical operations such as those described above) based on a version of dataset 114 as it existed at a particular point in time. Continuing with the example above, a service 138 may, at a subsequent point in time $t_2$, be used to perform analytical operations using data from dataset 114 as it existed at time $t_1$, when earlier analytical operations were performed at datacenter 110. In such an embodiment, request replayer 208 may retrieve information indicative of the results dataset 115 (e.g., dataset information 117) from the dataset information store 140. For example, service 138 may send a request (e.g., as an API call) to request replayer 208 with information identifying the results dataset 115 that is desired. Based on this information, request replayer 208 may retrieve the dataset information 117 from dataset information store 140 and provided it to service 138 or query engine 204. In various embodiments, the dataset information 117 retrieved by the request replayer 208 includes the version numbers associated with the data records in the results dataset 115 or, in some embodiments, a version number associated with the dataset 114 as it existed at the point in time $t_1$.

In various embodiments, the dataset information 117 may then be used by query engine 204 to retrieve the version of the results dataset 115 as it existed (or substantially as it existed) at the earlier time $t_1$. For example, query engine 204 may retrieve the data records in the results dataset 115, from the historical version of dataset 114 maintained at datacenter 130, using version numbers (and, optionally, key values) associated with the data records, as indicated by the retrieved dataset information 117. Stated differently, when the service 138 at the simulation datacenter 130 receives the dataset information 117, which includes the embedded version number information for data records in the results dataset 115, it may use query engine 204 to query the historical data records by their corresponding version numbers. Note that, in some embodiments, there may not be an available version number for one or more of the data records included in the results dataset 115. In such situations, query engine 204 may instead retrieve these data records (that is, the data records for which there are not available version numbers) based on their respective key values and the time $t_1$ at which they were initially retrieved for service 118 at datacenter 110. Once the service 138 under simulation at the simulation datacenter 130 receives this results dataset 115 as it existed at the earlier time $t_1$, it may perform any of various analytical operations to generate a simulation output. As one non-limiting example, service 118 may use the results dataset 115 at a first time $t_1$ to train a machine learning model usable to detect fraudulent transactions performed on the multi-datacenter system 200. At a later time $t_2$, service 138 may utilize the same results dataset 115 as it existed at time $t_1$ to train a new machine learning model that utilizes features that were discovered—after time $t_1$—to be indicative of a particular type of fraudulent transaction. This simulation output from service 138 may be stored, as one non-limiting example, in an output data lake accessible to simulation datacenter 130.

Note that, in some embodiments, the disclosed techniques may be implemented by a first and second datacenter in a multi-datacenter topology without regard to the status of the first and second datacenters as "production" or "simulation" datacenters or whether the first and second datacenters are considered part of a "production" or "non-production" environment. For example, in some embodiments, the operations described with reference to simulation datacenter 130 in non-production environment 104 may instead be performed by a production datacenter (e.g., production datacenter 120) in a production environment 102. For example, in some embodiments, the historical version of dataset 114 may be maintained at production datacenter 120 and service 128 may utilize query engine 204 and request replayer 208 to retrieve, at a subsequent time $t_2$, a results dataset 115 as it existed at an earlier time $t_1$. Such embodiments may be useful for instances in which a multi-datacenter system 100 does not have a dedicated non-production environment 104 or simulation datacenter 130 and, instead, performs various analytical operations at one or more of its production datacenters.

Figure 3A:
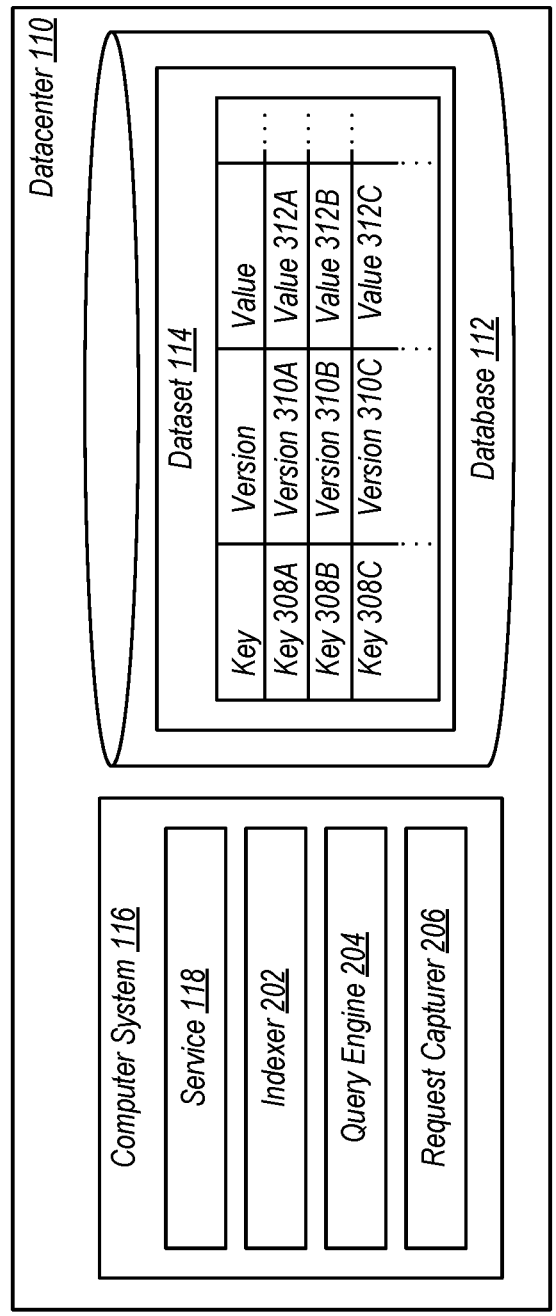
FIG. 3A is a block diagram illustrating an example production datacenter, according to some embodiments.

Referring now to FIG. 3A, a block diagram illustrating an example production datacenter 110 is depicted, according to some embodiments. In FIG. 3A, datacenter 110 includes computer system 116 and database 112. Note that, although only one computer system 116 and one database 112 are shown in FIG. 3A, this simplified embodiment is provided merely as an example. In other embodiments, datacenter 110 may include any suitable number of computer systems and databases, as desired.

An example embodiment of dataset 114 stored by database 112 is shown in FIG. 3A. In the depicted embodiment, dataset 114 is depicted as a table that includes multiple data records (denoted by rows in the table) for which there are multiple attributes (denoted by columns within the table). In various embodiments, the data records in dataset 114 are associated with a "version number" attribute that corresponds to a value of the data records at a particular point in time. For example, as described in more detail below, when a data record in dataset 114 is updated, indexer 202 generates a new version number for that data record. This new version number, along with the updated value, is then stored in the copy of dataset 114 maintained at datacenter 110. For example, when the data record corresponding to key value 308A is updated, indexer 202 may generate an updated version number 310A and update the version number attribute and value attribute within the dataset 114 for the data record. Note that the simplified embodiment depicted in FIG. 3A is provided merely as an example and is not intended to limit the scope of the present disclosure. In various embodiments, dataset 114 may be stored using any suitable data storage technique. In some embodiments, database 112 may be implemented as a relational database (e.g., an Oracle™ database, MySQL database, etc.) or non-relational database (implemented, for example, using Redis™, Oracle™ NoSQL Database, Couchbase™, etc.). Note that, although the disclosed techniques have been described with regard to a single dataset 114, in various embodiments, the disclosed systems and methods may be implemented for any suitable number of datasets that are replicated across multiple datacenters in a multi-datacenter system 100.

In FIG. 3A, computer system 116 is shown executing service 118 and an instance of indexer 202, query engine 204, and request capturer 206. Note that this embodiment is provided merely as one non-limiting example. In other embodiments, one or more of the service 118, indexer 202, query engine 204, and request capturer 206 may be executed by separate computer systems within the datacenter 110. Further, as noted above, in some embodiments, one or more of indexer 202, query engine 204, and request capturer 206 may be executed elsewhere within the multi-datacenter system 100 rather than at datacenter 110. For example, as noted above with reference to FIG. 2, in some embodiments, one or more of indexer 202, query engine 204, request capturer 206, and request replayer 208 may be implemented as microservices executed by various computer system at one or more datacenters within the multi-datacenter system 200. Note that, in some embodiments, indexer 202 may be integrated into the dataset channel 106. Additionally, note that, in some embodiments, the version numbers generated for the data records in dataset 114 may be generated using a single instance of indexer 202. For example, in instances in which an update to dataset 114 is generated at a particular location (e.g., at datacenter 130), then the version number may be generated by a single instance of the indexer 202 (e.g., executing at the datacenter 130 or elsewhere in the system 200, such as a computer system at datacenter 110 or 120, for example) and the update to dataset 114, along with the version number(s), may be pushed to the various datacenters in the system 200. Thus, in some embodiments, an instance of indexer 202 may be executed at one or more of the datacenters 110-130 and, in such embodiments, each instance of the indexer 202 is operable to generate the version numbers in the same manner such that, when an update to a data record in dataset 114 is received, each of the instances of indexer 202 at the separate datacenters generates the same version numbers. In other embodiments, however, system 200 may utilize indexer 202 (e.g., as part of dataset channel 106) to generate version numbers for updated data records in dataset 114 before publishing the updates to dataset 114 such that both the updates to dataset 114, along with the corresponding version numbers, are sent to the various datacenters in the system 200 (e.g., datacenters 110-130). Service 118, as described above, may be any of various suitable software applications that utilize data maintained at datacenter 110, such as dataset 114. In some embodiments, service 118 may perform various analytical operations using data from dataset 114. As a non-limiting example, service 118 may use data from dataset 114 to train and run machine learning models designed to detect fraudulent transactions attempted via the multi-datacenter system 100.

In various embodiments, indexer 202 is operable to generate version numbers for the data records in dataset 114. For example, when an update to dataset 114 is received (e.g., from dataset channel 106), indexer 202 may generate a new version number for each data record in dataset 114 that is being updated. As noted above, in some embodiments, indexer 202 is operable to generate a unique version number for each data record in dataset 114 each time it is updated. In other embodiments, indexer 202 is operable to generate a unique version number for each batch of updates to dataset 114 that it receives, and then to assign the same batch version number to each data record in the batch of data records that were updated. Indexer 202 may generate version numbers using any of various suitable algorithms. In some embodiments, indexer 202 is operable to generate the version numbers as universally unique identifiers (UUIDs) based, in part, on timestamp information associated with the update to dataset 114. (Note that, in some embodiments, dataset channel 106 may include timestamp information in the updates to dataset 114 as these updates are published to the various datacenters at which the dataset 114 is maintained. This timestamp information may indicate, for example, the time at which dataset channel 106 sends the updates to dataset 114 to the various datacenters.) In some embodiments, indexer 202 may generate the version numbers as UUIDs according to a standardized method, such as that described in IETF RFC 4122, as one non-limiting example. In some embodiments, indexer 202 may generate the version numbers using an auto-increment ID (e.g., sequence numbers in Oracle™ databases) combined with the datacenter ID for every record, batch of updates, or dataset. In other embodiments, indexer 202 is operable to generate the version numbers, based on timing information (e.g., timestamp information provided by dataset channel 106), that are not UUIDs. For example, in some embodiments, indexer 202 may use the timestamp information (or an encoded version of the timestamp information) as the version number for an updated data record or batch of updated data records in dataset 114. In other embodiments, indexer 202 may use the timestamp information to generate the version numbers, for example by using a hash function to generate a hash value based on the timestamp information (optionally with one or more other items of information, such as the data record key value, for example) and use this hash value as the version number for an updated data record. Non-limiting examples of hash functions that may be used by indexer 202, in some embodiments, to generate version numbers include MD5, SHA-1, SHA-2, or any other suitable cryptographic or non-cryptographic hash function. Further, in some embodiments, indexer 202 is operable to generate version numbers as random or pseudo-random numbers using any suitable random or pseudo-random number generation algorithms. Non-limiting examples of pseudo-random number generation algorithms that may be used by indexer 202, in some embodiments, to generate version numbers include the linear congruential generator, the Lehmer generator, the Wichmann-Hill generator, or any other suitable algorithm.

Query engine 204, in various embodiments, is operable to retrieve data maintained at datacenter 110 for use by various software applications, such as service 118. For example, in various embodiments, query engine 204 is operable to execute queries against dataset 114 to retrieve results dataset 115 for service 118. In some embodiments, query engine 204 may be implemented using a database management system (e.g., Oracle™ DBMS, etc.). In such embodiments, query engine 204 may retrieve the results dataset 115 by executing a database query against the dataset 114 stored in database 112. In other embodiments, the query engine 204 may retrieve the results dataset 115 by sending one or more requests (e.g., RESTful API requests) for data from the dataset 114. Request capturer 206, in various embodiments, is operable to capture dataset information 117 (that is, the "driver set" described above) that is indicative of the results dataset 115 retrieved by the query engine 204. In some embodiments, request capturer 206 may identify for storage a subset of the results dataset 115. For example, in some embodiments, request capturer 206 identify the version numbers of the data records included in the results dataset 115 and store these values as the dataset information 117 associated with a given results dataset 115. Further, in some embodiments, request capturer 206 may generate a dataset identifier value associated with results dataset 115 and the dataset information 117, which may be used (e.g., by request replayer 208) to subsequently retrieve the dataset information 117. This dataset identifier value may be generated using any of various suitable techniques. For example, in some embodiments, this dataset identifier value may be based on the time at which the results dataset 115 was retrieved, one or more data records included in the results dataset 115, the service 118 that requested the results dataset 115, a user of the service 118, or any other item of information usable to identify the results dataset 115 or the dataset information 117.

Figure 3B:
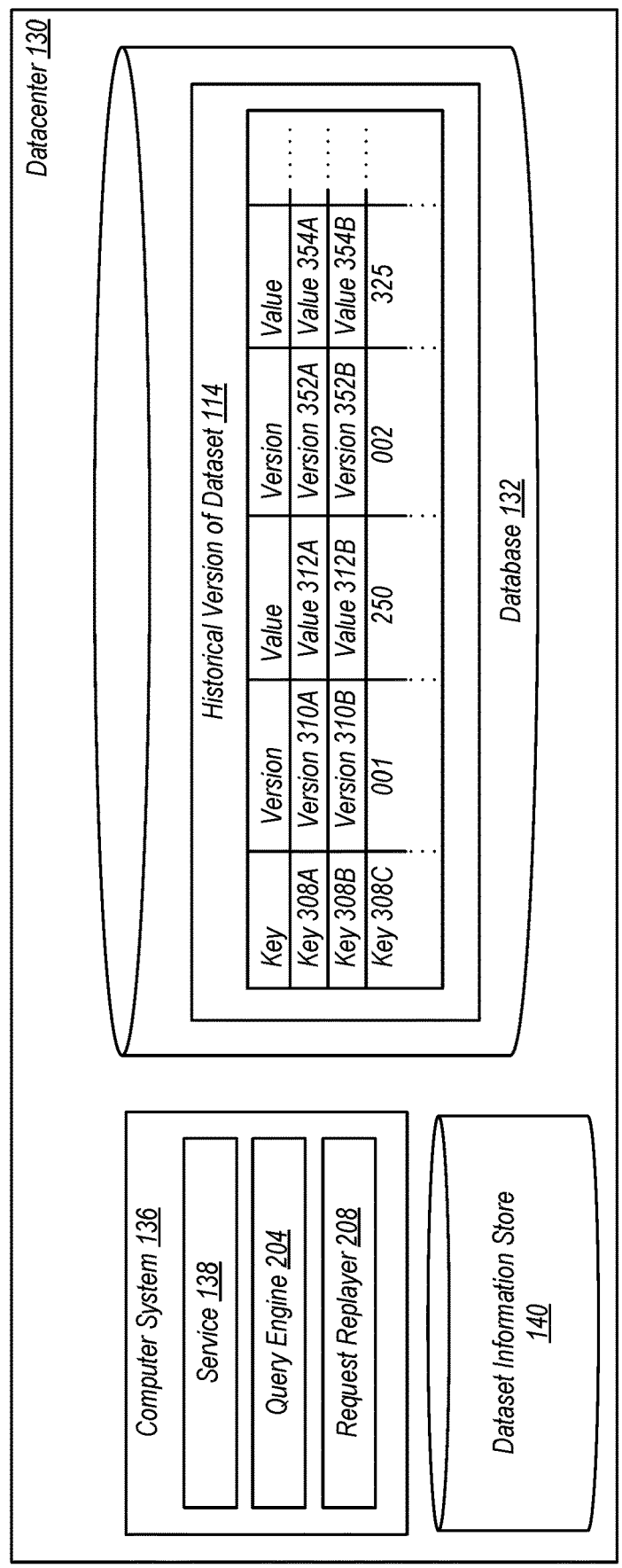
FIG. 3B is a block diagram illustrating an example non-production datacenter, according to some embodiments.

In FIG. 3B, a block diagram illustrating an example simulation datacenter 130 is depicted, according to some embodiments. In FIG. 3B, datacenter 130 includes computer system 136, dataset information store 140, and database 132. Note that, although only one computer system 136 and one database 132 are shown in FIG. 3B, this simplified embodiment is provided merely as an example. In other embodiments, datacenter 130 may include any suitable number of computer systems and databases, as desired.

An example embodiment of historical version of dataset 114 is depicted in FIG. 3B. In the depicted embodiment, the historical version of dataset 114 includes multiple data records for which there are multiple attributes. As shown in FIG. 3B, for each data record (e.g., the data record having key value 308A) there are multiple version numbers (e.g., version number 312A) and multiple corresponding data values (e.g., value 314A). As discussed above, in various embodiments, the historical version of dataset 114 stores the values of data records in dataset 114 as they change over time. For example, the data record with key value 308C may change over time. At a first point in time, this data record, having an initial value of "250," may be inserted into dataset 114 and indexer 202 may generate a version number (e.g., "001") for the data record. At a subsequent time, this data record may be updated to have a value of "325." When this update is published to the datacenter 130, indexer 202 may generate a new version number (e.g., "002") and store the updated value, along with the new version number, in the historical version of dataset 114. In various embodiments, the historical version of dataset 114 may include multiple values and corresponding version numbers for various data records in the dataset 114, allowing historical versions of the data records to be retrieved based on their version number. In some embodiments, a historical version of a particular data record may be retrieved solely using its version number. For example, in embodiments in which indexer 202 generates version numbers that are unique (or for which there is a low probability of collision between multiple version number values), a historical version of the particular data record may be retrieved by querying the historical version of dataset 114 using its version number. In other embodiments, a historical version of a particular data record may be retrieved using its key value and the appropriate version number. Further, note that the depiction of the historical version of dataset 114 depicted in FIG. 3B is provided merely as one example and is not intended to limit the scope of the present disclosure. In other embodiments, some of the information shown in FIG. 3B may be stored as an index in database 132. For example, in some embodiments, the version numbers associated with the data records in the historical version of dataset 114 may be stored in a database index to enable efficient retrieval of data records.

Datacenter 130 of FIG. 3B further includes dataset information store 140. As noted above, in various embodiments, dataset information store 140 is operable to store dataset information 117 captured by request capturer 206 at one or more production datacenters (e.g., datacenters 110 or 120 of FIG. 1). In various embodiments, dataset information store 140 may be implemented as a data lake (e.g., using Apache™ Hadoop). Note, however, that this embodiment is provided merely as an example and is not intended to limit the scope of the present disclosure. In other embodiments, dataset information store 140 may be implemented using any of various suitable data storage techniques. Further, note that dataset information store 140 may be used to store driver set information associated with multiple results datasets retrieved for various services (such as services 118 or 128 at datacenters 110 and 120, respectively) at various points in time.

In FIG. 3B, computer system 136 is shown executing service 138 and an instance of query engine 204 and request replayer 208. Note that, as described above with reference to FIG. 3A, the depicted embodiment is provided merely as one non-limiting example. In other embodiments, one or more of the service 138, query engine 204, and request replayer 208 may be executed by separate computer systems within the datacenter 130. Further, as noted above, in some embodiments, one or more of indexer 202, query engine 204, and request replayer 208 may be executed at various computer systems within the multi-datacenter system 100. Service 138, as described above, may be any of various suitable software applications that utilize data maintained at datacenter 130, such as data from the historical version of dataset 114. In some embodiments, service 138 may perform various analytical operations using data from the historical version of dataset 114. As a non-limiting example, service 138 may use data from dataset 114 to train and run machine learning models designed to detect fraudulent transactions attempted via the multi-datacenter system 100.

Request replayer 208, in various embodiments, is operable to retrieve dataset information (that is, a "driver set"), associated with a desired results dataset, from dataset information store 140. In the embodiment described above, for example, request replayer 208 is operable to retrieve dataset information 117 associated with the results dataset 115 on which service 118 performs analytical operations at a first time $t_1$. For example, service 138 may send a request to request replayer 208 that includes information indicative of the desired results dataset 115 (e.g., the dataset identifier value described above). Request replayer 208 may then use this information to query dataset information store 140 to retrieve the desired dataset information 117, from dataset information store 140, for use by query engine 204, according to various embodiments. Note that, in some embodiments, datacenter 130 may further include (or have access to) an orchestrator (not separately shown in FIG. 3B, for clarity) that is operable to take in user requests that identify the historical traffic that the user would like to replay. As one non-limiting example, a user may be a data scientist that wishes to replay historical traffic from the United States in the last three days. In such an embodiment, the orchestrator may then pass this request to the request replayer 208 to retrieve the appropriate dataset information 117, from dataset information store 140, and provide it to service 138 or query engine 204 so that the desired historical traffic may be replayed.

In various embodiments, the instance of query engine 204 shown executing at the datacenter 130 in the depicted embodiment may operate in much the same manner as that described above with reference to FIGS. 2 and 3A. Further, in embodiments in which the datacenter 130 includes an instance of the indexer 202, it may also operate in the same manner as described above with reference to FIGS. 2 and 3A. For example, in various embodiments, indexer 202 is operable to generate version numbers for the data records in the historical version of dataset 114. For example, when an update to dataset 114 is received (e.g., from dataset channel 106), indexer 202 may generate a new version number for each data record that is being updated. In various embodiments, indexer 202 may generate the version numbers for the historical version of dataset 114 using any of the various techniques discussed above. Note, however, that regardless of the specific techniques used to generate the version numbers, indexer 202 executing at datacenter 130 and indexer 202 executing at datacenter 110, in various embodiments, are operable to generate the version numbers using the same technique such that version numbers generated for a given update to a given data record are the same at both datacenters 110 and 130. (Note that, in some embodiments, indexer 202 may be implemented as a microservice or integrated into dataset channel 106. In some such embodiments, indexer 202 is operable to generate and embed version numbers into the updates to dataset 114 prior to sending the updates to the various datacenters at which the dataset 114 is maintained.) Additionally, in various embodiments, query engine 204 is operable to retrieve historical data maintained at datacenter 130 for use by various software applications, such as service 138. For example, in various embodiments, query engine 204 is operable to execute queries against the historical version of dataset 114 to retrieve historical data records for service 138. Query engine 204 at datacenter 130 may be implemented using any of various suitable data retrieval techniques, as discussed above.

Example Methods

Turning now to FIG. 4, a flow diagram illustrating an example method 400 for utilizing data versioning in a multi-datacenter topology is depicted, according to some embodiments. In various embodiments, method 400 may be performed by one or more computer systems at datacenter 110 in multi-datacenter system 200 of FIG. 2. For example, datacenter 110 may include (or have access to) a non-transitory, computer-readable medium having program instructions stored thereon that are executable by at least one of the one or more computer systems to cause the operations described with reference to FIG. 4. In FIG. 4, method 400 includes elements 402-406. Although these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, method 400 includes executing, at a first point in time, the first query against a particular dataset a first production datacenter. For example, query engine 204 may be used to execute a first query against the copy of dataset 114 maintained at datacenter 110. In some embodiments, the particular dataset includes a plurality of data records that are each associated with a corresponding version number. In some embodiments, for example, the particular dataset may be a risk analytics dataset that is usable to perform various risk detection operations.

At 404, in the illustrated embodiment, method 400 includes receiving, in response to executing the first query, a first results dataset that includes a first data record with a first version number that is associated with a value of the first data record at the first point in time. For example, in response to its query, query engine 204 may receive results dataset 115 that includes a first data record with an embedded version number that is associated with the value of the first data record at first point in time $t_1$.

At 406, in the illustrated embodiment, method 400 includes storing information indicative of the first results dataset, where the information specifies the first version number associated with the first data record and is usable, at a second subsequent time, to retrieve the first data record with the same value as at the first point in time from a historical version of the particular dataset. For example, in some embodiments, request capturer 206 may identify and store dataset information 117 that is indicative of the results dataset 115 retrieved by the query engine 204. In some embodiments, the dataset information 117 may be stored in dataset information store 140, which may be maintained, for example, at simulation datacenter 130.

In some embodiments, method 400 may include generating corresponding version numbers for each of the plurality of data records in the particular dataset. For example, in some embodiments, indexer 202 is operable to generate version numbers associated with the data records in dataset 114 as those data records are updated. As one non-limiting example, indexer 202 may generate the version numbers by generating a UUID for each of the plurality of data records as those data records are updated. As noted above, in some instances, updates to dataset 114 may be published to the various datacenters in multi-datacenter system 200 in batches. In such embodiments, method 400 may further include receiving, at the first production datacenter prior to the first point in time, a batch of updated data records associated with the particular dataset, where a batch of updated data records includes updated values for each of the plurality of data records. In some such embodiments, generating the corresponding version numbers may include assigning a single version number to all of the plurality of data records that were updated in the batch.

Note that, in some embodiments, method 400 may include one or more operations performed at a simulation datacenter 130. For example, in some embodiments, method 400 includes maintaining, at a simulation datacenter, a historical version of the particular dataset, where the historical version of the particular dataset includes one or more historical values for each of the plurality of data records at different points in time. For example, simulation datacenter 130 may maintain a historical version of dataset 114 that includes multiple values for one or more of the data records in dataset 114, the multiple values corresponding to the state of a given data record at different points in time. In some such embodiments, method 400 may include retrieving, by a computer system at the simulation datacenter, information indicative of the first results dataset from the data store (e.g., dataset information store 140), where the information specifies the first version number associated with the first data record. Using this information, the computer system may retrieve, at the second, subsequent point in time, the first data record from the historical version of the particular dataset, where the first data record retrieved at the second subsequent point in time has the same value as it did at the first point in time.

Referring now to FIG. 5, a flow diagram illustrating an example method 500 for utilizing data versioning in a multi-datacenter topology is depicted, according to some embodiments. In various embodiments, method 500 may be performed by one or more computer systems at datacenter 130 in multi-datacenter system 200 of FIG. 2. For example, simulation datacenter 130 may include (or have access to) a non-transitory, computer-readable medium having program instructions stored thereon that are executable by at least one of the one or more computer systems to cause the operations described with reference to FIG. 5. In FIG. 5, method 500 includes elements 502-506. Although these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, method 500 includes retrieving, by a first computer system at a simulation datacenter, information indicative of a first results dataset. For example, request replayer 208 may retrieve dataset information 117 (from dataset information store 140) that is indicative of the results dataset 115. In various embodiments, this information may include a first version number associated with the first data record from the first results dataset, where the first results dataset was retrieved from a particular dataset at a first point in time. For example, in some embodiments, a results dataset 115 may be retrieved from a copy of dataset 114 stored at production datacenter 110 at a first point in time $t_1$. In some embodiments, the first version number may be associated with a value of the first data record at this first point in time.

At 504, the illustrated embodiment, method 500 includes maintaining, at the simulation datacenter, a historical version of the particular dataset, where the historical version of the particular dataset includes one or more historical values for the first data record at different points in time. For example, simulation datacenter 130 may include database 132, which may be used to store a historical version of dataset 114 that includes multiple values of one or more data records that correspond to the values of those data records at different points in time. (Note that, in various embodiments, the historical version of dataset 114 may not include multiple values for one or more of the data records in the dataset. For example, a relatively new data record or a data record that never changes from its initial state may only have a single value associated therewith in the historical version of the dataset 114.)

At 506, in the illustrated embodiment, method 500 includes retrieving, based on the first version number, the first data record from the historical version of the particular dataset at a second, subsequent point in time. In various embodiments, the first data record retrieved at the second, subsequent point in time has the same value as the first data record did at the first point in time.

In various embodiments, method 500 may include generating version numbers associated with one or more data records in the historical version of the dataset. For example, in some embodiments, method 500 may include receiving, at the simulation datacenter prior to the first point in time, an updated value for the first data record. In such embodiments, method 500 may include generating the first version number associated with the updated value for the first data record and updating the first data record in the historical version of the particular dataset to include the updated value and the first version number. Note, however, that, in some embodiments, the version numbers associated with the one or more data records (e.g., the first version number associated with the updated value for the first data record) in the historical version of the dataset may be generated (e.g., by an indexer 202 incorporated into the dataset channel 106) before the updated values for the data records are received at the simulation datacenter. In some such embodiments, the simulation datacenter may receive updated values for one or more data records along with version numbers that were previously generated by indexer 202. In some embodiments, generating the first version number may include generating a UUID for the first data record. Additionally, as noted above, in some embodiments the updated value for the first data record may be included in a batch of updated data records associated with a particular dataset, where a batch of updated data records includes updated values for each of a plurality of data records. In some such embodiments, generating the first version number may include assigning the first version number as an updated version number for all of the plurality of data records.

Note that, in some embodiments, method 500 may further include operations performed at datacenters other than simulation datacenter 130. For example, in some embodiments, method 500 may include operations performed at a production datacenter, such as datacenter 110. In some such embodiments, method 500 may include receiving, at a first production datacenter prior to the first point in time, an updated value for the first data record. A computer system at the first production datacenter may then generate the first version number associated with the updated value for the first data record, where the first version number generated at the first production datacenter is the same the first version number for the first data record generated at the simulation datacenter. In such embodiments, method 500 may include updating, by computer system at the first production datacenter, the first data record, stored in a copy of the particular dataset maintained at the first production datacenter, to include the updated value and the first version number. Note, however, that in some embodiments, the version numbers for the updated data records (e.g., the first version number associated with the updated value for the first data record) may be generated before the updated values are received at the first production datacenter. For example, in some embodiments, indexer 202 may generate the version numbers before the updates to data records in dataset 114 are sent to the various datacenters.

Further, in some embodiments, method 500 may further include executing, by a computer system at the first production datacenter, the first query against the copy of the particular dataset maintained at the first production datacenter to retrieve the first results dataset. In some embodiments, subsequent to executing the first query, a computer system at the first productions datacenter may store the information indicative of the first results dataset in a data store that is accessible to one or more computer systems at the simulation datacenter.

Figure 6:
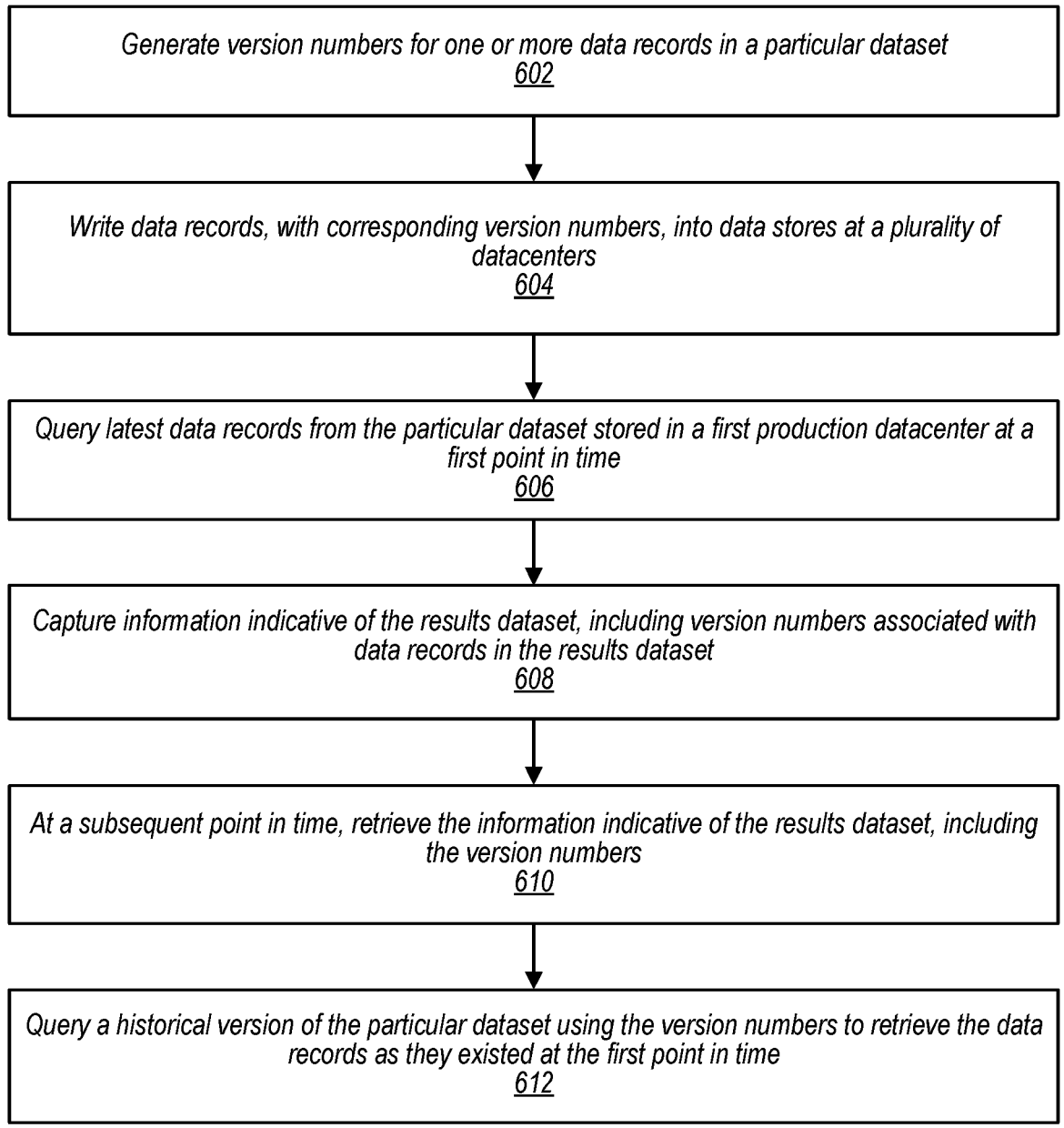
FIG. 6 is a flow diagram illustrating an example method for utilizing data versioning to address technical problems caused by "eventually consistent" datasets stored across multiple datacenters in a multi-datacenter topology, according to some embodiments.

In FIG. 6, a flow diagram illustrating an example method 600 for utilizing data versioning to address technical problems caused by "eventually consistent" datasets stored across multiple datacenters in a multi-datacenter topology is depicted, according to some embodiments. In various embodiments, method 600 may be performed by one or more computer systems depicted in multi-datacenter system 200 of FIG. 2. For example, one or more computer systems located at one or more of datacenters 110-130 may include (or have access to) one or more non-transitory, computer-readable media having program instructions stored thereon that are executable by at least one of the one or more computer systems to cause the operations described with reference to FIG. 6. In FIG. 6, method 600 includes elements 602-612. Although these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, method 600 includes generating version numbers for one or more data records in a particular dataset. For example, in various embodiments, indexer 202 is operable to generate version numbers for updated data records in dataset 114. As described above, in various embodiments, dataset 114 may be replicated across multiple datacenters, including production datacenters such as datacenters 110 and 120, and non-production datacenters, such as datacenter 130. At 604, in the illustrated embodiment, method 600 includes writing data records, with corresponding version numbers, into data stores at a plurality of datacenters. For example, dataset channel 106 (or indexer 202) may write updated data records, embedded with corresponding version numbers, to databases 112, 122, and 132 respectively maintained at datacenters 110, 120, and 130.

At 606, in the illustrated embodiment, method 600 includes querying the latest data records from the particular dataset stored in a first production datacenter at a first point in time. For example, in various embodiments, query engine 204 is operable to retrieve the latest data records from dataset 114 for a requesting service (such as service 118 or 128) running at a production datacenter at a first time $t_1$. In various embodiments, in response to executing the query, query engine 204 may return a results dataset 115 to the requesting service. At 608, in the illustrated embodiment, method 600 includes capturing information indicative of the results dataset, including the version numbers of the data records in the results dataset and the first point in time at which the results dataset was retrieved. This dataset information 117, also referred to herein as a "driver set," may be captured by request capture 206 and stored in dataset information store 140.

At 610, in the illustrated embodiment, method 600 includes retrieving, at a subsequent point in time, the information indicative of the results dataset, including the version numbers for the data records included in the results dataset. For example, in various embodiments, request replayer 208 is operable to retrieve dataset information 117, including the version numbers associated with data records in the results dataset 115, for service 138 under simulation at the simulation datacenter 130. At 612, and the illustrated embodiment, method 600 includes querying a historical version of the particular dataset, using the version numbers, to retrieve the data records in the results dataset as they existed at the first point in time. For example, in some embodiments, service 138 may send, at a later point in time $t_2$, a request to query engine 204 for the results dataset 115 as it existed at the first time $t_1$. In response to this request, query engine 204 may query the historical version of dataset 114 maintained at datacenter 130 using the version numbers retrieved by request replayer 208. Query engine 204 may then return this results dataset 115 to the service 138 for use in the desired operations (e.g., any of the various data analytics operations discussed above). In various embodiments, service 138 that is under simulation at the simulation datacenter 130 may generate a simulation output based on these historical data records.

Example Computer System

Figure 7:
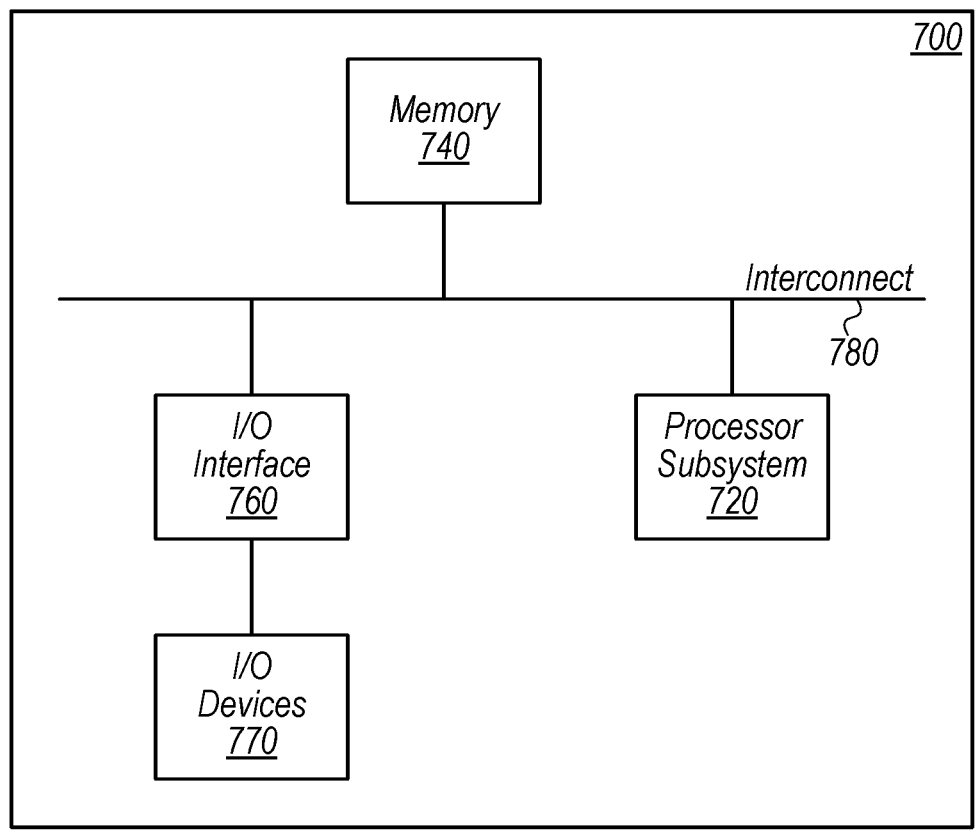
FIG. 7 is a block diagram illustrating an example computer system, according to some embodiments.

Referring now to FIG. 7, a block diagram of an example computer system 700 is depicted, which may implement one or more computer systems, such as computer system 116 at datacenter 110, computer system 126 at datacenter 120, or computer system 136 at datacenter 130, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e. something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., indexer 202, query engine 204, request capturer 206, request replayer 208, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardware circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
executing, by a computer system at a first point in time, a first query against a particular dataset at a first production datacenter, wherein the particular dataset includes a plurality of data records that are each associated with a corresponding version number, and wherein, for a given one of the plurality of data records, a corresponding version number of the given data record is associated with a value of the given data record at a given point in time;
in response to executing the first query, receiving, by the computer system, a first results dataset that includes a first data record of the plurality of data records with a first version number that is associated with a value of the first data record at the first point in time; and
storing information indicative of the first results dataset in a data store, wherein the information specifies the first version number associated with the first data record and is usable to retrieve, at a second point in time subsequent to the first point in time from a historical version of the particular dataset stored in a historical database separate from the data store, the first data record with the same value as at the first point in time.

2. The method of claim 1, further comprising:
generating the corresponding version number for each of the plurality of data records.

3. The method of claim 2, wherein the generating the corresponding version numbers includes generating a universally unique identifier (UUID) for each of the plurality of data records.

4. The method of claim 2, further comprising:
receiving, at the first production datacenter prior to the first point in time, a batch of updated data records associated with the particular dataset,
wherein the batch of updated data records includes updated values for each of the plurality of data records, and
wherein the generating the corresponding version numbers includes assigning a single version number to all of the plurality of data records.

5. The method of claim 1, further comprising:
maintaining, at a simulation datacenter, the historical version of the particular dataset, wherein the historical version of the particular dataset includes one or more historical values for each of the plurality of data records at different points in time.

6. The method of claim 5, further comprising:
retrieving, by a second computer system at the simulation datacenter, the information indicative of the first results dataset from the data store, wherein the information specifies the first version number associated with the first data record; and
retrieving, by the second computer system at the second point in time, the first data record from the historical version of the particular dataset, wherein the first data record retrieved at the second point in time has the same value as at the first point in time.

7. The method of claim 1, wherein the particular dataset is a risk analytics dataset usable to perform risk detection operations.

8. A method, comprising:
retrieving, by a first computer system at a simulation datacenter, information indicative of a first results dataset, wherein the information includes:
a first version number associated with a first data record from the first results dataset, wherein the first results dataset was retrieved from a particular dataset at a first point in time, and wherein the first version number is associated with a value of the first data record at the first point in time;
maintaining, at the simulation datacenter in a data store, a historical version of the particular dataset, wherein the historical version of the particular dataset includes one or more historical values for the first data record at different points in time; and
based on the first version number, retrieving, by the first computer system at a second point in time that is subsequent to the first point in time, the first data record from the historical version of the particular dataset stored in a historical database separate from the data store, wherein the first data record retrieved at the second point in time has the same value as at the first point in time.

9. The method of claim 8, further comprising:
receiving, at the simulation datacenter prior to the first point in time, an updated value for the first data record;
generating the first version number associated with the updated value for the first data record; and
updating, by the first computer system at the simulation datacenter, the first data record in the historical version of the particular dataset to include the updated value and the first version number.

10. The method of claim 9, wherein the first version number associated with the updated value for the first data record is generated by the first computer system at the simulation datacenter.

11. The method of claim 9, wherein the updated value for the first data record is included in a batch of updated data records associated with the particular dataset,
wherein the batch of updated data records includes updated values for each of a plurality of data records, and
wherein the generating the first version number includes assigning the first version number as an updated version number for all of the plurality of data records.

12. The method of claim 8, further comprising:
receiving, at a first production datacenter prior to the first point in time, an updated value for the first data record;
generating, by a second computer system at the first production datacenter, the first version number associated with the updated value for the first data record, wherein the first version number for the first data record generated at the first production datacenter is the same as the first version number for the first data record generated at the simulation datacenter; and updating, by the second computer system at the first production datacenter, the first data record, stored in a copy of the particular dataset maintained at the first production datacenter, to include the updated value and the first version number.

13. The method of claim 12, further comprising:
executing, by the second computer system at the first point in time, a first query against the copy of the particular dataset maintained at the first production datacenter to retrieve the first results dataset.

14. The method of claim 13, further comprising:
subsequent to executing the first query, storing, by the second computer system at the first production datacenter, the information indicative of the first results dataset in a data store accessible to the first computer system at the simulation datacenter.

15. A system, comprising:
at least one processor;
a memory having instructions stored thereon that are executable by the at least one processor to cause the system to execute a first datacenter and a second datacenter:
the first datacenter that includes:
  a first database storing a copy of a particular dataset; and
  a first plurality of computer systems, wherein at least one of the first plurality of computer systems stores program instructions that are executable by one or more of the first plurality of computer systems to:
    receive an updated version of the particular dataset that includes updated values for a plurality of data records, wherein the updated version of the particular dataset is associated with a first point in time;
    generate a version number for each of the plurality of data records, wherein, for a given one of the plurality of data records, a given corresponding version number is associated with a value of the given data record at the first point in time; and
    update the copy of the particular dataset to include the updated value and the version number for each of the plurality of data records; and
the second datacenter that includes:
  a second database storing a historical version of the particular dataset, wherein the historical version of the particular dataset includes one or more historical values for each of the plurality of data records at different points in time; and
  a second plurality of computer systems, wherein at least one of the second plurality of computer systems stores second program instructions that are executable by one or more of the second plurality of computer systems to:
    receive the updated version of the particular dataset that includes updated values for the plurality of data records;
    generate a version number for each of the plurality of data records, wherein the version numbers generated for the plurality of data records at the second datacenter are the same as the version numbers generated for the plurality of data records at the first datacenter; and
    update the historical version of the particular dataset to include the updated value and the version number for each of the plurality of data records, wherein the updated value and the version number for each of the plurality of data records are usable to retrieve, at a subsequent point in time from the historical version of the particular dataset, data records with the same value as at the first point in time.

16. The system of claim 15, wherein the program instructions are further executable by one or more of the first plurality of computer systems to:
execute, at a second point in time, a first query against the updated copy of the particular dataset to retrieve a first results dataset, wherein the first results dataset includes a first data record, of the plurality of data records, with a first version number that is associated with a value of the first data record at the first point in time; and
store information indicative of the first results dataset in a data store that is accessible to one or more computer systems at the second datacenter, wherein the information specifies the first version number associated with the value of the first data record at the first point in time.

17. The system of claim 16, wherein the second program instructions are further executable by one or more of the second plurality of computer systems to:
retrieve the information indicative of the first results dataset from the data store; and
retrieve, at a third, subsequent point in time, the first data record from the updated historical version of the particular dataset using the first version number, wherein a value of the first data record at the third, subsequent point in time is the same value as the value of the first data record at the first point in time.

18. The system of claim 17, wherein the first results dataset further includes a second data record; wherein the second program instructions are further executable by one or more of the second plurality of computer systems to:
determine that, for the second data record, the information indicative of the first results dataset does not include a corresponding version number; and
retrieve the second data record from the updated historical version of the particular dataset based on the second point in time at which the first query was executed at the first datacenter.

19. The system of claim 15, wherein, to generate the version number for each of the plurality of data records, the program instructions are further executable by one or more of the first plurality of computer systems to:
generate a unique version number for each of the plurality of data records.

20. The system of claim 15, wherein, to generate the version number for each of the plurality of data records, the program instructions are further executable by one or more of the first plurality of computer systems to:
generate a single version number for each of the plurality of data records for which the updated version of the particular dataset includes an updated value.

* * * * *